US009809197B2

United States Patent
Miyazawa et al.

(10) Patent No.: US 9,809,197 B2
(45) Date of Patent: Nov. 7, 2017

(54) VEHICLE COMMUNICATION DEVICE

(71) Applicant: Alps Electric Co., Ltd., Tokyo (JP)

(72) Inventors: Akira Miyazawa, Miyagi-ken (JP); Katsuhiro Seino, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/192,707

(22) Filed: Jun. 24, 2016

(65) Prior Publication Data
US 2016/0304056 A1    Oct. 20, 2016

Related U.S. Application Data

(63) Continuation of application No. PCT/JP2015/050459, filed on Jan. 9, 2015.

(30) Foreign Application Priority Data

Jan. 14, 2014  (JP) .................................. 2014-004310

(51) Int. Cl.
*G05D 1/00*  (2006.01)
*G05D 3/00*  (2006.01)
(Continued)

(52) U.S. Cl.
CPC ........ *B60R 25/245* (2013.01); *G07C 9/00309* (2013.01); *G08C 17/02* (2013.01);
(Continued)

(58) Field of Classification Search
CPC .............. B60R 25/245; G07C 9/00309; G07C 2009/63; G07C 2009/00388; G07C 2009/00555; G08C 17/02; H04Q 9/00
See application file for complete search history.

(56) References Cited

U.S. PATENT DOCUMENTS 8,831,526 B2 * 9/2014 Hasegawa .......... H04B 17/0042
455/562.1
2004/0178883 A1 * 9/2004 Haselsteiner ........... B60R 25/24
340/5.72
(Continued)

FOREIGN PATENT DOCUMENTS

JP   2010-028550   2/2010
JP   2010-185186   8/2010
(Continued)

OTHER PUBLICATIONS

English_translation for _JP20130013A.*
(Continued)

*Primary Examiner* — Rachid Bendidi
(74) *Attorney, Agent, or Firm* — Beyer Law Group LLP

(57) ABSTRACT

A moving device receives a 100% duty measurement signal transmitted from an in-vehicle device. The receive strength of the received measurement signal is divided into unit time, and the average value of the receive strength for each unit time is determined The maximum value and the minimum value of the average value are determined, and the ratio between the maximum value and the minimum value is transmitted to the in-vehicle device as signal strength fluctuation information. The in-vehicle device determines that a communication state is abnormal if it is determined that the fluctuation ratio exceeds a predetermined threshold.

6 Claims, 4 Drawing Sheets

(51) Int. Cl.
*G06F 7/00* (2006.01)
*G06F 17/00* (2006.01)
*B60R 25/24* (2013.01)
*H04Q 9/00* (2006.01)
*G08C 17/02* (2006.01)
*G07C 9/00* (2006.01)

(52) U.S. Cl.
CPC ..... *H04Q 9/00* (2013.01); *G07C 2009/00388* (2013.01); *G07C 2009/00555* (2013.01); *G07C 2209/63* (2013.01)

(56) References Cited

U.S. PATENT DOCUMENTS

| | | | | |
|---|---|---|---|---|
| 2007/0046427 A1* | 3/2007 | Ghabra | ............... | B60R 25/246 340/5.61 |
| 2007/0109093 A1* | 5/2007 | Matsubara | ......... | G07C 9/00309 340/5.61 |
| 2007/0162191 A1* | 7/2007 | Matsubara | ......... | G07C 9/00309 701/1 |
| 2010/0201483 A1* | 8/2010 | Nakajima | ............. | B60R 25/245 340/5.61 |
| 2015/0070136 A1* | 3/2015 | Kameyama | ............. | B60R 25/20 340/5.72 |
| 2015/0321643 A1* | 11/2015 | Nowottnick | .......... | B60R 25/245 340/5.6 |
| 2015/0325070 A1* | 11/2015 | Miyazawa | ......... | G07C 9/00309 340/5.63 |

FOREIGN PATENT DOCUMENTS

| | | |
|---|---|---|
| JP | 2012-077587 | 4/2012 |
| JP | 2013130013 A * | 7/2013 |
| JP | 2013218657 A * | 10/2013 |
| KR | 20130028472 A * | 10/2013 |

OTHER PUBLICATIONS

English_translation for _JP2013218657A.*
English_translation for _KR20130028472A.*
International Search Report from PCT/JP2015/050459 dated Apr. 7, 2015.

* cited by examiner

VEHICLE COMMUNICATION DEVICE

CLAIM OF PRIORITY

This application is a Continuation of International Application No. PCT/JP2015/050459 filed on Jan. 9, 2015, which claims benefit of Japanese Patent Application No. 2014-004310 filed on Jan. 14, 2014. The entire contents of each application noted above are hereby incorporated by reference.

BACKGROUND OF THE INVENTION

1. Field of the Invention

The present invention relates to a vehicle communication device which performs communication between an in-vehicle device and a moving device to enable operation processing, such as unlocking and locking of a door of a vehicle or engine start.

2. Description of the Related Art

Japanese Unexamined Patent Application Publication No. 2012-077587 discloses an electronic key system which performs communication between an in-vehicle device and an electronic key (moving device).

In this electronic key system, a wake signal, a signal for RSSI measurement, and a vehicle ID signal are transmitted from the in-vehicle device. In the electronic key, RSSI information is generated from the average value of electric field strength when receiving the RSSI signal, a key ID signal is generated based on an ID stored in a memory in the electronic key, and the RSSI information and the key ID signal are returned to the in-vehicle device side.

In the in-vehicle device, the received RSSI information is compared with a plurality of thresholds, and an area where the electronic key is present is determined according to the threshold which is exceeded. If the area is determined and it is determined that the IDs match each other when receiving the key ID signal, unlocking or locking of the door is performed, or the engine is started.

In a vehicle communication device, called an intelligent key system, a smart key system, or an electronic key system, which performs communication between an in-vehicle device provided in a vehicle and a portable moving device, an RSSI measurement signal is used, whereby an area where the portable moving device is present with respect to the vehicle is determined However, if noise is superimposed on the RSSI measurement signal, it is not possible to accurately recognize the area where the moving device is present. In recent years, a fraudulent action of artificially generating and transmitting a false RSSI measurement signal and transmitting a response signal from the moving device to the in-vehicle device even though an occupant is away from the vehicle has been performed.

In the invention described in Japanese Unexamined Patent Application Publication No. 2012-077587, an on time and an off time are included in the signal for RSSI measurement transmitted from the in-vehicle device, and the electronic key generates the RSSI information from the average value of receive electric field strength of both of the on time and the off time. If the off time is provided, when noise is superimposed, the average value of receive electric field strength fluctuates according to the strength of noise. In the in-vehicle device, a threshold for detecting noise is set, and if the RSSI information exceeds the threshold, it is determined that there is an influence of noise.

However, in the electronic key system described in Japanese Unexamined Patent Application Publication No. 2012-077587, since the threshold for detecting noise is set empirically, it is not possible to identity a signal for RSSI measurement including an unexpected noise component. For example, when a false signal for RSSI measurement which has large fluctuation in signal strength but has an average value of signal strength having no significant difference from a normal signal is sent due to a fraudulent action, the RSSI information does not exceed the threshold for noise detection; thus, it is determined that normal communication is performed.

SUMMARY OF THE INVENTION

The invention provides a vehicle communication device capable of identifying whether or not a normal measurement signal is received even when a measurement signal having large fluctuation in signal strength is sent.

A vehicle communication device according to an aspect of the invention includes an in-vehicle device mounted in a vehicle, and a moving device configured to be movable inside and outside the vehicle. The vehicle communication device performs communication between the in-vehicle device and the moving device, the moving device is provided with a receiver configured to receive a vehicle-side signal transmitted from the in-vehicle device, a moving-side controller configured to generate a response signal to the received vehicle-side signal, and a transmitter configured to transmit the response signal to the in-vehicle device, and a measurement signal is included in the vehicle-side signal, and signal strength measurement information based on the receive strength of a measurement reception signal obtained by receiving the measurement signal in the moving device and signal strength fluctuation information based on fluctuation in the receive strength of the measurement reception signal are included in the response signal.

In the vehicle communication device according to the aspect of the invention, when the moving device receives the measurement signal, the signal strength measurement information can be generated from the average value of the strength of the measurement reception signal, and the signal strength fluctuation information based on fluctuation in receive strength can be generated. Therefore, it is possible to determine that communication is not normal when a measurement signal of an abnormal waveform which has large fluctuation in signal strength but has an average value close to a normal value is received.

The moving-side controller may divide the measurement reception signal into a plurality of sections, may determine the average value of the receive strength in each section, and may generate the signal strength fluctuation information from the ratio between the maximum value and the minimum value of the average value of each section.

The measurement reception signal obtained by receiving the measurement signal is time-divided into a plurality of sections and the average value of the each section is obtained, whereby it is possible to easily recognize fluctuation of the measurement reception signal.

The measurement signal may be transmitted with a time difference from a plurality of antennas disposed at different positions of the vehicle, and the moving device may receive the measurement signal transmitted from the respective antennas, may generate the signal strength measurement information corresponding to the respective antennas, and may transmit the signal strength measurement information to the in-vehicle device.

In this case, it is preferable that the moving device selects the measurement reception signal with the largest fluctuation width in receive strength among the measurement reception signals obtained by receiving the measurement signals transmitted from all antennas to generate the signal strength fluctuation information.

The signal strength measurement information corresponding to each antenna is transmitted from the moving device to the in-vehicle device, and the distance between each antenna and the moving device is individually determined. Since the signal strength fluctuation information is information for determining whether or not the measurement signal is abnormal, the measurement reception signal with the largest fluctuation width of the receive strength among a plurality of measurement reception signals received from the respective antennas may be represented and transmitted to the in-vehicle device. With this, it is possible to minimize the signal length of the signal strength fluctuation information, and to reduce the amount of data transmitted from the moving device to the in-vehicle device.

In the vehicle communication device according to the aspect of the invention, the receiver receives the measurement signal from three-axis directions orthogonal to one another and generates the signal strength measurement information based on the receive strength of the measurement reception signal received from the three-axis directions.

In this case, it is preferable that the measurement reception signal with the largest fluctuation width of the receive strength among the measurement reception signals of the three-axis reception signals is selected to generate the signal strength fluctuation information.

The measurement signal transmitted from one antenna is received in the moving device as a signal from three-axis directions, whereby three kinds of measurement reception signals are obtained in the moving device. If the measurement reception signal with the largest fluctuation of in receive strength among measurement reception signals of three kinds is represented to generate the signal strength fluctuation information, it is possible to process the signal strength fluctuation information as a signal with the minimum amount of information.

In the vehicle communication device according to the aspect of the invention, for example, the moving device may calculate the distance to the in-vehicle device from the average value of the measurement reception signal, and the distance information may be included in the signal strength measurement information.

In the vehicle communication device according to the aspect of the invention, in a case where fluctuation in receive strength is extremely large even though the average value of the receive strength of the measurement reception signal received in the moving device has no significant difference from a normal value, it is possible to determine that the measurement signal received at this time is an abnormal signal. With this, when the measurement signal is affected by abnormal noise, the position of the moving device is not erroneously determined, and when a fraudulent measurement signal is transmitted, it is possible to determine that the reception state is not normal.

DESCRIPTION OF THE PREFERRED EMBODIMENTS

Figure 1:
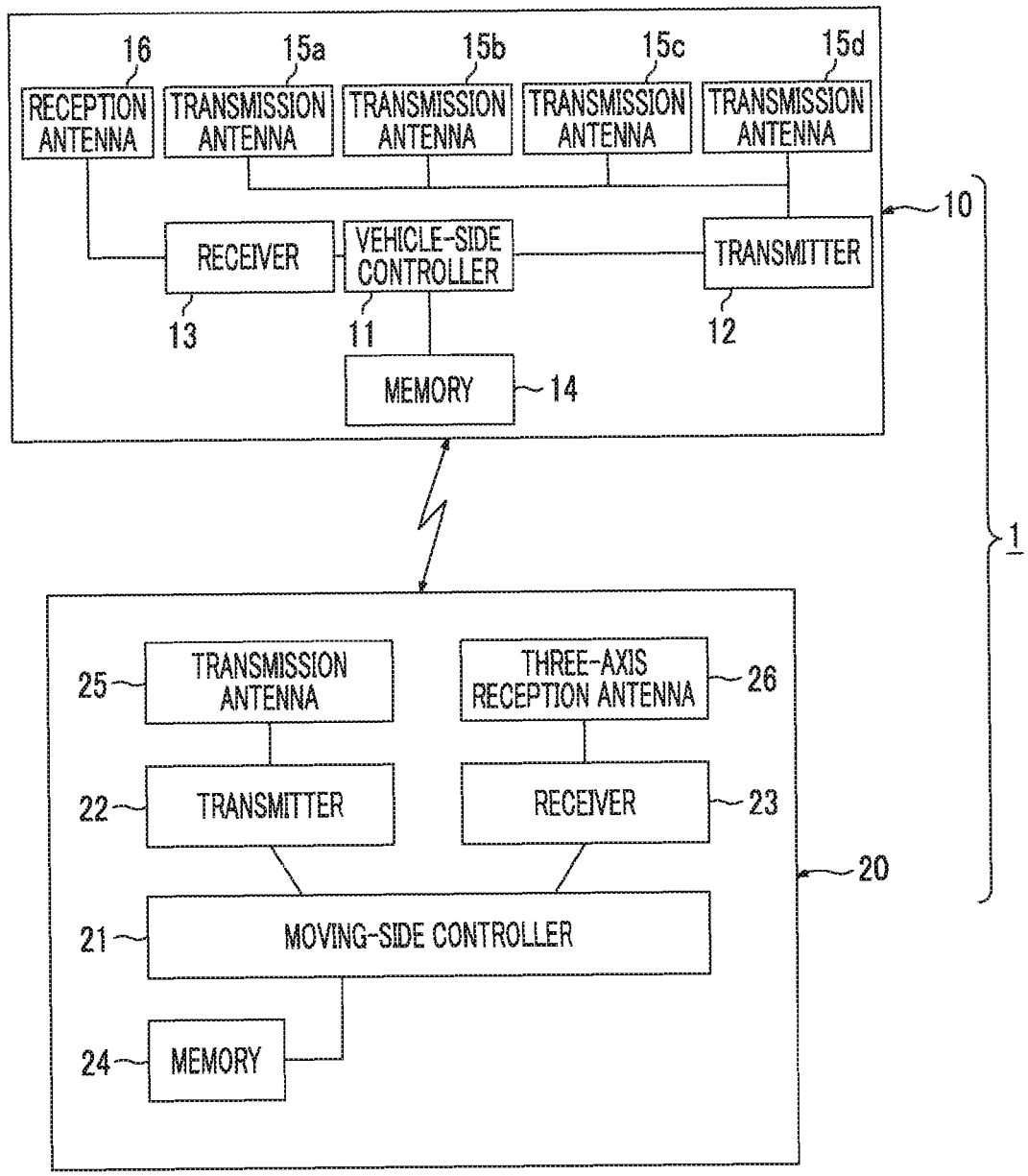
FIG. 1 is a block diagram of a vehicle communication device according to an embodiment of the invention.

A vehicle communication device 1 shown in FIG. 1 is called an intelligent key system, a smart key system, an electronic key system, or the like, and has a configuration in which an in-vehicle device 10 and a moving device 20 are combined.

Figure 2:
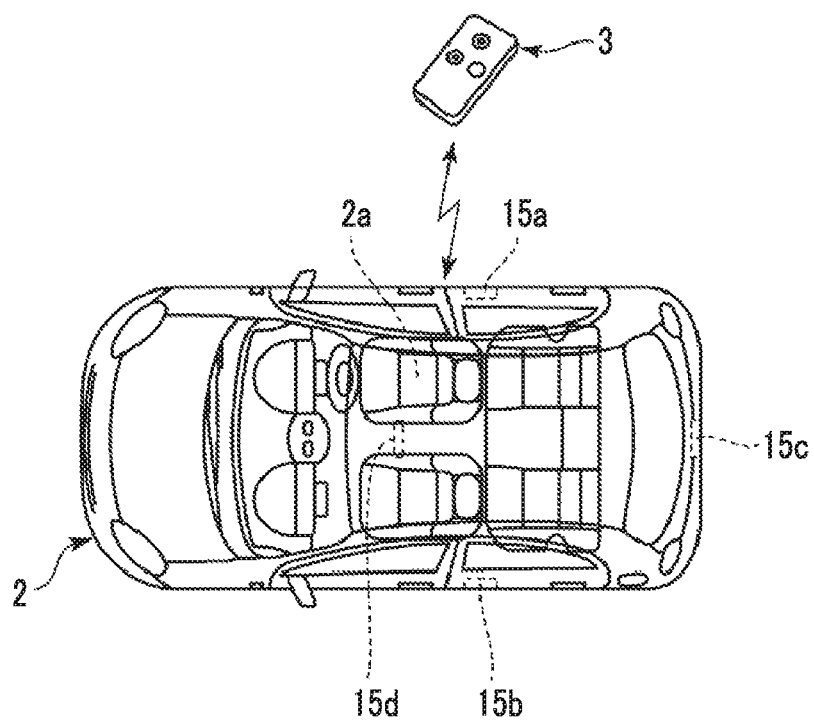
FIG. 2 is a plan view showing an in-vehicle device and a moving device.

The in-vehicle device 10 is mounted in a vehicle (automobile) shown in FIG. 2. The moving device 20 is mounted in a portable key 3 shown in FIG. 2. The portable key 3 is carried by an occupant, and is movable in a vehicle interior 2a and an outside of a vehicle 2.

As shown in FIG. 1, the in-vehicle device 10 has a vehicle-side controller 11. The vehicle-side controller 11 is primarily constituted of a CPU, and is connected to a memory 14. The in-vehicle device 10 is provided with a transmitter 12 and a receiver 13. A transmission antenna is connected to the transmitter 12. A plurality of transmission antennas are provided, at least one transmission antenna is disposed inside the vehicle interior 2a, and other transmission antennas are disposed nearby in the outside of the vehicle 2.

In the embodiment shown in FIG. 2, a transmission antenna 15a is disposed in the vicinity of an operating part of a right door, and a transmission antenna 15b is disposed in the vicinity of an operating part of a left door. A transmission antenna 15c is disposed in the vicinity of an opening/closing operating part of a trunk. A transmission antenna 15d is disposed inside the vehicle interior 2a.

As shown in FIG. 1, the in-vehicle device 10 is provided with a reception antenna 16. The reception antenna 16 is provided inside the vehicle interior 2a.

The moving device 20 has a moving-side controller 21, a transmitter 22, and a receiver 23. The moving-side controller 21 is primarily constituted of a CPU, and a memory 24 is connected to the moving-side controller 21. A transmission antenna 25 is connected to the transmitter 22. A three-axis reception antenna 26 is connected to the receiver 23. The three-axis reception antenna 26 has antenna units directed in three directions so as to detect electromagnetic waves from three-axis directions orthogonal to one another on a space. The receiver 23 receives the reception signals of the antenna units of the three-axis reception antenna 26, thereby receiving electromagnetic waves from the three-axis directions. The receiver 23 may be constituted of three receiver units connected to the antenna units on an one-to-one basis.

Figure 3:
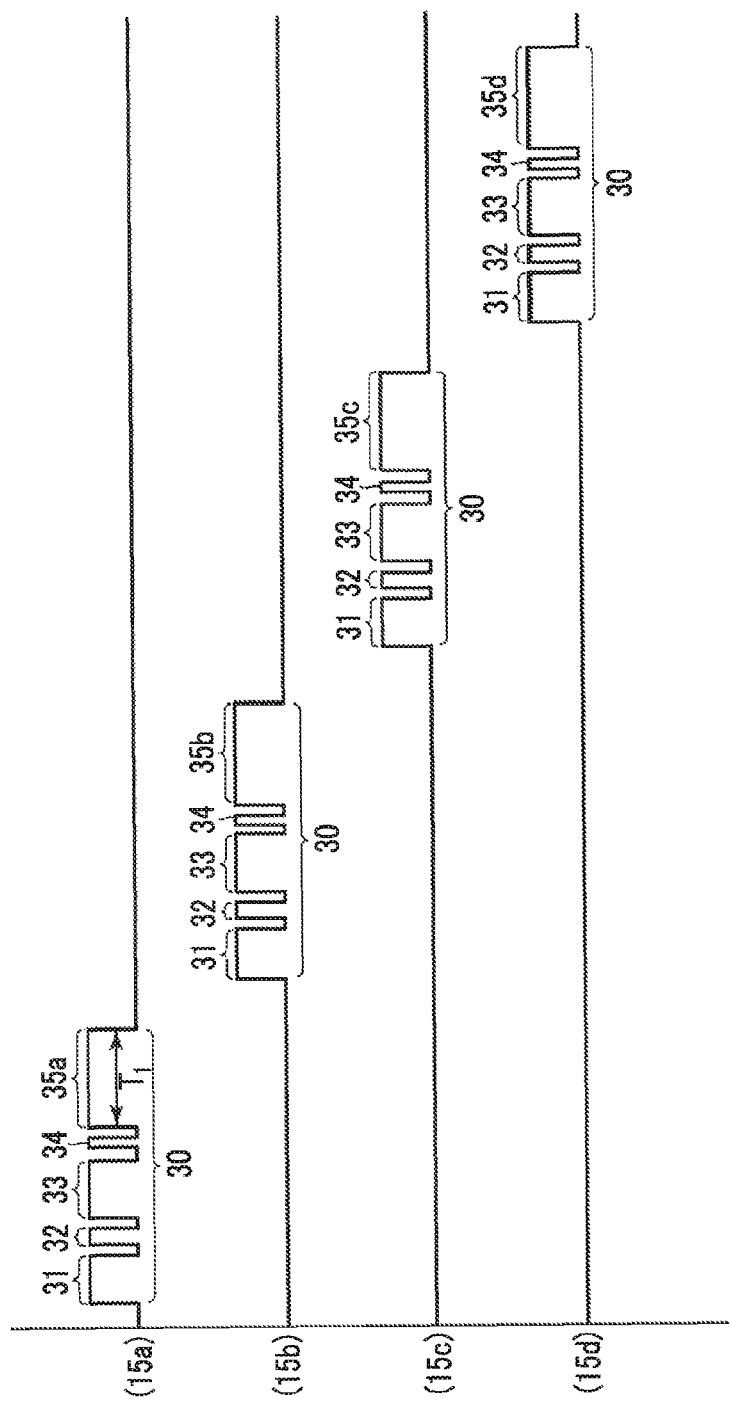
FIG. 3 is a waveform chart showing an example of a vehicle-side signal transmitted from the in-vehicle device.

A vehicle-side signal 30 shown in FIG. 3 is generated by the vehicle-side controller 11. In the vehicle-side transmitter 12, a carrier wave of an LF band (for example, 125 kHz) is generated, is modulated with the vehicle-side signal 30, and is transmitted to the moving device 20. At this time, the same vehicle-side signals 30 are transmitted in order with a time difference from a plurality of transmission antennas 15a, 15b, 15c, and 15d so as not to overlap one another.

For example, when a door opening/closing button of the vehicle 2 is depressed, when a trunk opening button is depressed, when an engine start key is depressed, or the like, the vehicle-side signal 30 is transmitted with an operation signal of any button as a trigger.

In the moving device 20, the vehicle-side signals 30 transmitted from the transmission antennas 15a, 15b, 15c, and 15d are received in order by the three-axis reception antenna 26, and are detected and demodulated as reception signals in the receiver 23. Each of the vehicle-side signals 30 transmitted from a plurality of transmission antennas 15a, 15b, 15c, and 15d is received by the three-axis reception antenna 26 as a reception signal from three directions of an x axis, a y axis, and a z axis orthogonal to one another. In the moving-side receiver 23, the vehicle-side signal 30 transmitted from one transmission antenna is detected and demodulated as a reception signal from the three-directions of the x axis, the y axis, and the z axis, and the reception signal is given to the moving-side controller 21.

Figure 4:
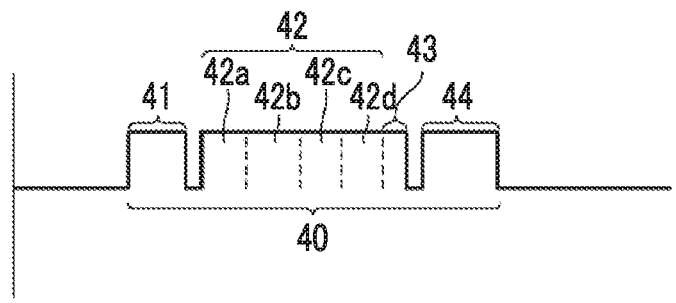
FIG. 4 is a waveform chart showing an example of a response signal transmitted from the moving device.

If the vehicle-side signal 30 is received in the moving device 20, a response signal 40 shown in FIG. 4 is generated in the moving-side controller 21. In the moving-side transmitter 22 provided in the moving device 20, a carrier wave of a UHF band (for example, 315 MHz) is generated, is modulated with the response signal 40, and is transmitted from the transmission antenna 25 to the in-vehicle device 10. The response signal 40 transmitted from the moving device 20 is received by the reception antenna 16 of the in-vehicle device 10, is detected by the vehicle-side receiver 13, is demodulated, is A/D-converted, and is given to the vehicle-side controller 11.

In the vehicle communication device 1 of the embodiment, as shown in FIG. 3, the vehicle-side signals 30 are transmitted in order from the transmission antennas 15a, 15b, 15c, and 15d of the in-vehicle device 10, and in the moving device 20, if the reception of the vehicle-side signals 30 sent from all transmission antennas is completed, the response signal 40 shown in FIG. 4 is generated, and communication is performed to transmit the response signal 40 to the in-vehicle device 10. However, a waveform shown in FIGS. 4 and 5 is an example of a signal, and the invention is not limited to communication of a signal content shown in FIGS. 3 and 4. For example, the vehicle-side signal 30 may be divided into signal contents and transmitted with a time difference, and the response signal 40 may be transmitted from the moving device 20 in the middle of the vehicle-side signal 30 divided and transmitted. At this time, the response signal 40 may be divided and transmitted for the respective divided contents of the vehicle-side signal 30, and thus, alternate communication may be performed.

The vehicle-side signal 30 shown in FIG. 3 includes a wake-up signal 31, a synchronization signal 32, a command signal 33, a timing signal 34, and a measurement signal 35 (35a, 35b, 35c, 35d) which are transmitted in parallel. The vehicle-side signal 30 is generated by subjecting on-off keying (OOK modulation) to the carrier wave. The same effect is obtained using other modulation systems, such as phase shift keying (PSK).

The command signal 33 instructs an operation to be performed by the moving-side controller 21, and includes an instruction requesting transmission of an ID signal allocated to each moving device 20.

The timing signal 34 is a signal indicating that the measurement signal 35 follows thereafter, and is constituted by combining pulses having a short wavelength.

The measurement signal 35 is a signal for receive strength signal indicator (RSSI), and a signal of a 100% duty ratio continues for a given time T1 (for example, 1 ms). In FIG. 3, a measurement signal transmitted from the transmission antenna 15a is referred to as 35a, a measurement signal transmitted from the transmission antenna 15b is referred to as 35b, a measurement signal transmitted from the transmission antenna 15c is referred to as 35c, and a measurement signal transmitted from the transmission antenna 15d is referred to as 35d.

In the response signal 40 from the moving device 20 shown in FIG. 4, a signal group including signal strength measurement information 42 and signal strength fluctuation information 43 follows synchronization signal 41, and thereafter, an ID response signal 44 is generated.

The signal strength measurement information 42 is time-divided into first signal strength measurement information 42a, second signal strength measurement information 42b, third signal strength measurement information 42c, and fourth signal strength measurement information 42d.

The first signal strength measurement information 42a includes information relating to the receive strength of a measurement reception signal obtained by receiving the measurement signal 35a transmitted from the transmission antenna 15a. The measurement signal 35a is divided and received as a measurement reception signal from the three directions of the x axis, the y axis, and the z axis orthogonal to one another by the three-axis reception antenna 26 of the moving device 20.

When the average value of the receive strength (receive electric field strength) of the measurement reception signal obtained by receiving the measurement signal 35a from the x-axis direction is Xp, the average value of the receive strength of the measurement reception signal obtained by receiving the measurement signal 35a from the y-axis direction is Yp, and the average value of the receive strength of the measurement reception signal obtained by receiving the measurement signal 35a from the z-axis direction is Zp, the first signal strength measurement information 42a can be determined by $(Xp2+Yp2+Zp2)^{1/2}$. The first signal strength measurement information 42a determined by this arithmetic operation includes information (distance information) relating to the distance between the transmission antenna 15a and the moving device 20.

The following arithmetic operation may be performed using the average values Xp, Yp, and Zp to include distance information L directly indicating the distance between the transmission antenna 15a and the moving device 20 in the first signal strength measurement information 42a. In the following expression, K is a proportional constant for converting the average value of each receive strength to the distance information L.

$$L=K/\{(Xp2+Yp2+Zp2)^{1/2}\}^{1/3}$$

A way to determine the average values Xp, Yp, and Zp of the receive strength of the measurement reception signals of the x axis, the y axis, and the z axis is as follows. The measurement reception signals having an analog value received by the receiver 23 are subjected to A/D conversion and given to the moving-side controller 21, and an arithmetic operation is performed with the digital values in the moving-side controller 21 to determine the average value of the receive strength of the measurement reception signal in the section of the time T1. Alternatively, the measurement reception signal having an analog value received by the receiver 23 is successively integrated at a given time interval synchronized with a clock signal to determine the average value in the section of the time t1 is determined, and the average value is subjected to A/D conversion and given to the moving-side controller 21.

The same arithmetic operation as above is performed, whereby the second signal strength measurement information 42b including the distance information between the transmission antenna 15b and the moving device 20 is generated, the third signal strength measurement information 42c including the distance information between the transmission antenna 15c and the moving device 20 is generated, and the fourth signal strength measurement information including the distance information transmission antenna 15d and the moving device 20 is generated.

The signal strength fluctuation information 43 included in the response signal 40 shown in FIG. 4 indicates fluctuation in the receive strength of the measurement reception signal obtained by receiving the measurement signals 35a, 35b, 35c, and 35d respectively transmitted from the transmission antennas 15a, 15b, 15c, and 15d.

Figure 5A:
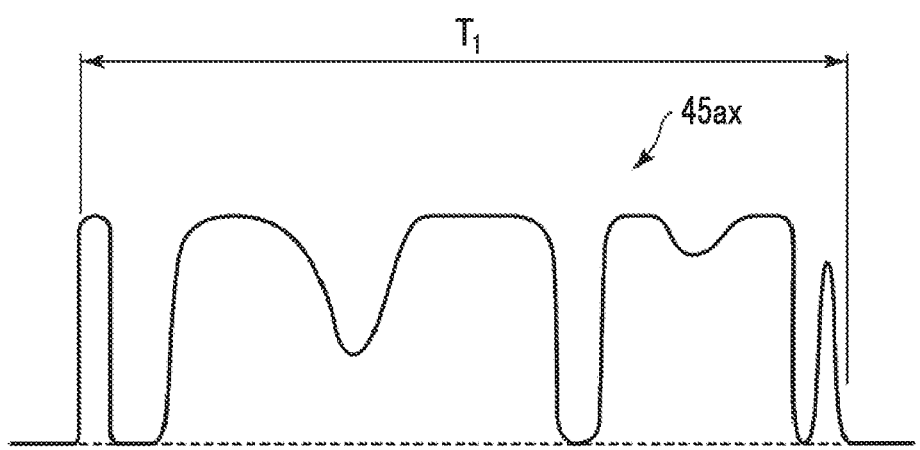
FIG. 5A is a waveform chart showing a measurement reception signal obtained by receiving a measurement signal with fluctuation in receive strength.

FIG. 5A is a waveform chart of a measurement reception signal 45ax when the measurement signal 35a transmitted from the transmission antenna 15a is received from the x-axis direction by the three-axis reception antenna 26 of the moving device 20. The waveform shown in FIG. 5A assumes that the measurement signal 35a is not in a normal signal state in which fluctuation in the transmit strength of the measurement signal 35a is intense.

Figure 5B:
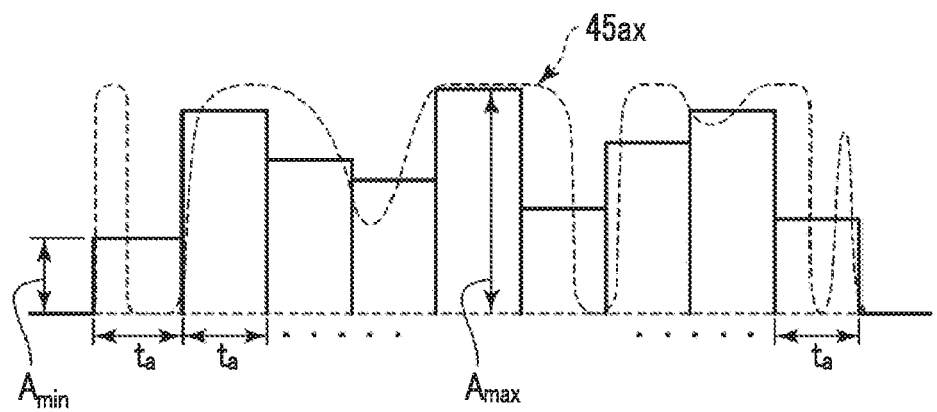
FIG. 5B is a waveform chart illustrating processing for determining a fluctuation coefficient of a measurement reception signal when an abnormal measurement signal is received.

In the moving device 20, the signal length T1 of the measurement reception signal 45ax shown in FIG. 5A is divided into unit time ta as shown in FIG. 5B. For example, in a case where the signal length T1 is 1 ms, the unit time ta is divided into about (⅕) to (1/15) ms. The receive strength (receive electric field strength) of the measurement reception signal 45ax is divided into the unit time ta and averaged. In FIG. 5B, the average value of the receive strength obtained at each unit time ta is shown in the form of a bar graph.

A way to determine the average value of the receive strength of the measurement reception signal divided as shown in FIG. 5B is as follows. The measurement reception signal 45ax of the x axis having an analog value received by the receiver 23 is subjected to A/D conversion and given to the moving-side controller 21, and the receive strength is averaged as a digital value at each unit time ta in the moving-side controller 21.

Alternatively, the measurement reception signal 45ax of the x axis having an analog value received by the receiver 23 is successively integrated at a time interval of the unit time ta synchronized with a clock signal to determine the average value, and the average value of each unit time ta is subjected to A/D conversion and given to the moving-side controller 21.

In the example shown in FIG. 5B, the maximum value of the average value of the receive strength determined at each unit time ta is Amax, and the minimum value of the average value of the receive strength determined at each unit time ta is Amin. A fluctuation coefficient of the receive strength is represented by Amin/Amax. In the moving-side controller 21, te fluctuation coefficient of the receive strength is expressed in a range of 1.0 to 25.5 in a stepwise manner. The fluctuation coefficient when Amin and Amax are equal to each other is 1.0, the fluctuation coefficient increases with an increase in the difference between Amin and Amax, and the maximum fluctuation coefficient is 25.5.

In the moving device 20, similarly, the fluctuation coefficient is determined from Amin and Amax of a measurement reception signal 45ay when the measurement signal 35a is received on the y axis of the three-axis reception antenna 26 is determined, and the fluctuation is determined from Amin and Amax of a measurement reception signal 45az when the measurement signal 35a is received on the z axis of the three-axis reception antenna 26.

In the moving device 20, the fluctuation coefficients of the measurement reception signals of the x axis, the y axis, and the z axis are determined for the measurement signal 35b transmitted from the transmission antenna 15b, and the fluctuation coefficients of the measurement reception signals of the x axis, the y axis, and the z axis are determined for the measurement signals 35c and 35d transmitted from the transmission antennas 15c and 15d.

Table 1 described below shows an example of the fluctuation coefficients of the receive strength when the measurement signals 35a, 35b, 35c, and 35d transmitted from the transmission antenna 15a (Ant1), the transmission antenna 15b (Ant2), the transmission antenna 15c (Ant3), and the transmission antenna 15d (Ant4) are received on the x axis, the y axis, and the z axis.

TABLE 1

|   | Ant1 | Ant2 | Ant3 | Ant4 |
|---|------|------|------|------|
| x | 5.0  | 1.1  | 1.1  | 1.0  |
| y | 1.0  | 1.1  | 3.0  | 2.5  |
| z | 1.5  | 1.0  | 1.2  | 2.0  |

In the result of Table 1 described above, since the fluctuation coefficient of the measurement reception signal when the measurement signal 35a from the transmission antenna 15a (Ant1) is received on the x axis has the largest value of "5", the fluctuation coefficient of "5" is included in the signal strength fluctuation information 43 included in the response signal 40 shown in FIG. 4.

In the moving device 20, while the measured receive strength is obtained corresponding to the number obtained by multiplying the number of transmission antennas by the three axes of x, y, and z, only the fluctuation coefficient with the largest fluctuation value of the receive strength among the measured receive strength is transmitted as the signal strength fluctuation information 43. For this reason, it is possible to shorten the data length of the signal strength fluctuation information 43 and to shorten the signal length of the response signal 40.

An arithmetic operation of $\{(x\text{-axis fluctuation coefficient})^2 + (y\text{-axis fluctuation coefficient})^2 + (z\text{-axis fluctuation coefficient})^2\}^{1/2}$ may be performed on the measurement reception signals obtained from the respective transmission antennas to determine the fluctuation values of the receive strength of the measurement reception signals relating to the transmission antennas, and the largest fluctuation value among the fluctuation values calculated for a plurality of transmission antennas may be represented as the signal strength fluctuation information 43.

As described above, the first signal strength measurement information 42a, the second signal strength measurement information 42b, the third signal strength measurement information 42c, and the fourth signal strength measurement information 42d included in the response signal 40 are the average values of the receive strength of the measurement reception signals at the time T1 obtained by receiving the measurement signals 35a, 35b, 35c, and 35d on the x axis, the y axis, and the z axis. As described above, although the average values can be determined by averaging the measurement reception signals at the time T1, as shown in FIG. 5B, the average values determined in a state of being divided into the unit time to may be added according to the length of the time T1, and may be further averaged and determined.

Next, ID data specific to the combination of the in-vehicle device 10 and the moving device 20 is stored in the memory 24 of the moving device 20. If the transmission of an ID response signal from the moving device 20 is instructed by the command signal 33 included in the vehicle-side signal 30 from the in-vehicle device 10, in the moving-side controller 21, an ID signal is read from the memory 24, and the ID response signal 44 including the ID signal is generated and transmitted to the in-vehicle device 10 as the response signal 40.

In the in-vehicle device 10, the response signal 40 shown in FIG. 4 is received by the reception antenna 16, is detected and demodulated by the receiver 13, and is given to the vehicle-side controller 11 through the A/D conversion unit.

The vehicle-side controller 11 reads the signal strength fluctuation information 43 and compares the fluctuation coefficient (in the example of Table 1, "5") included in the signal strength fluctuation information 43 with a threshold. In a case where the fluctuation coefficient is greater than the threshold, it is determined that communication is abnormal, and the subsequent processing operation in the moving-side controller 21 is stopped.

In a case where the fluctuation coefficient included in the signal strength fluctuation information 43 is smaller than the threshold, it is determined that communication is normal. In this case, the first signal strength measurement information 42a, the second signal strength measurement information 42b, the third signal strength measurement information 42c, and the fourth signal strength measurement information 42d included in the response signal 40 are analyzed, and an area where the moving device 20 is positioned with respect to the vehicle 2 is determined It is determined whether or not the ID signal included in the ID response signal 44 matches the ID stored in the memory 14 on the in-vehicle device 10 side, and when the ID signal matches the ID, the subsequent control operation is permitted.

For example, if it is determined that the moving device 20 is operated at a position near the right door, unlocking or locking of the right door is performed, and if it is determined that the moving device 20 is operated at a position near the left door, unlocking or locking of the left door is performed. If it is determined that the moving device 20 is operated near the trunk, the trunk is unlocked. if it is determined that the moving device 20 is operated inside the vehicle interior 2a, engine start processing is performed.

In the foregoing embodiment, even in a case where it is determined that all average values of the receive strength of the measurement reception signals obtained by receiving the measurement signals 35a, 35b, 35c, and 35d are within a range of a normal signal, in a case where fluctuation in receive strength is intense, it is possible to determine the receive strength. For this reason, a problem that noise is superimposed and the position of the moving device 20 cannot be accurately recognized is eliminated, and in a case where a fraudulent measurement signal is sent artificially, it is possible to identify the fraudulent measurement signal, and to operate a vehicle under high security.

It should be understood by those skilled in the art that various modifications, combinations, sub-combinations and alterations may occur depending on design requirements and other factors insofar as they are within the scope of the appended claims of the equivalents thereof.

What is claimed is:

1. A vehicle communication device comprising:
   an in-vehicle device mounted in a vehicle, the in-vehicle device including a vehicle-side controller and being configured to transmit a vehicle-side signal including a measurement signal; and
   a moving device configured to be carried in and out of the vehicle, the in-vehicle device and the moving device being configured to communicate with each other, the moving device including:
      a receiver configured to receive the vehicle-side signal transmitted from the in-vehicle device, and obtain a received measurement signal corresponding to the measurement signal sent from the in-vehicle device;
      a moving-side controller configured to generate a response signal in response to the received vehicle-side signal; and
      a transmitter configured to transmit the response signal to the in-vehicle device, the response signal including:
         signal strength measurement information obtained from a reception strength of the received measurement signal; and
         signal strength fluctuation information obtained from fluctuation in the reception strength of the received measurement signal,
   wherein the moving-side controller divides the received measurement signal into a plurality of sections, determines an average value of the reception strength in each section, and generates the signal strength fluctuation information indicating a ratio between a maximum value and a minimum value of the average value of each section,
   and wherein the vehicle-side controller compares the ratio indicated by the signal strength fluctuation information with a threshold and determines that communication between the in-vehicle device and the moving device is normal if the ratio is smaller than the threshold so as to perform a subsequent control operation on the vehicle, while determining that the communication between the in-vehicle device and the moving device is abnormal if the ratio is greater than the threshold so as not to perform the subsequent control operation on the vehicle.

2. The vehicle communication device according to claim 1,
   wherein the in-vehicle device includes a plurality of antennas disposed at different positions of the vehicle, and transmits a plurality of measurement signals by transmitting the measurement signal from the plurality of antennas at respective timings with a time difference therebetween,
   and wherein the moving device receives the plurality of measurement signals transmitted from the plurality of antennas, generates the signal strength measurement information corresponding to the plurality of antennas, and transmits the signal strength measurement information to the in-vehicle device.

3. The vehicle communication device according to claim 2,
   wherein the moving device selects one of the received measurement signals which has a widest fluctuation range in the reception strength from among the plurality of received measurement signals, and generates the signal strength fluctuation information from the selected received measurement signal.

4. The vehicle communication device according to claim 1,
wherein the in-vehicle device transmits the measurement signal in three-axis directions orthogonal to one another,
and wherein the receiver receives the measurement signal from the three-axis directions, so as to obtain corresponding three received measurement signals and generates the signal strength measurement information based on the reception strength of the three received measurement reception signals.

5. The vehicle communication device according to claim 4,
wherein in the moving device, one of the received measurement signals which has a widest fluctuation range in the reception strength is selected from among the three received measurement signals to generate the signal strength fluctuation information therefrom.

6. The vehicle communication device according to claim 1,
wherein the moving device calculates a distance to the in-vehicle device from an average value of the received measurement signal, the signal strength measurement information including the calculated distance.

\* \* \* \* \*